UNITED STATES PATENT OFFICE.

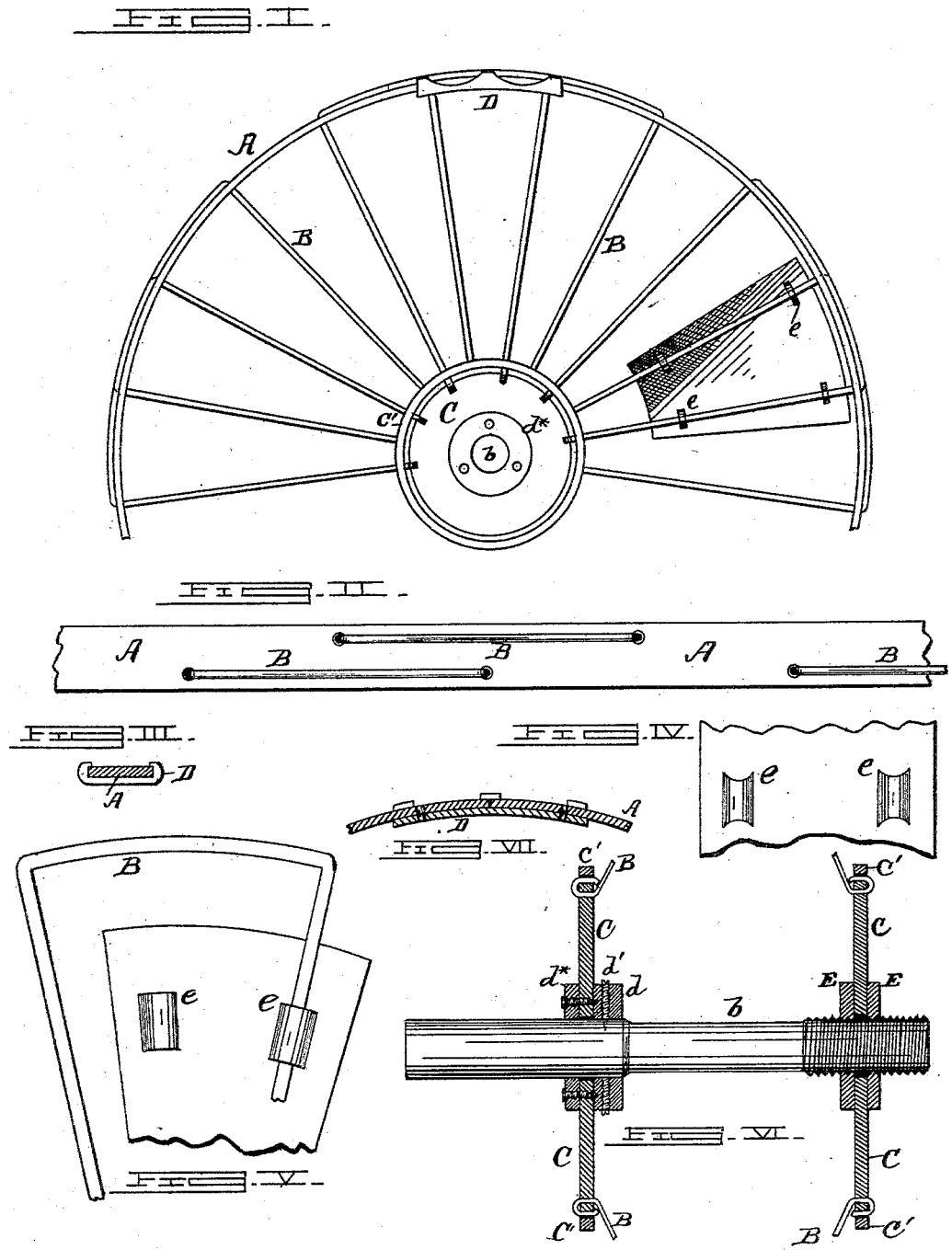

WILLIAM ECKER, OF NEWARK, NEW JERSEY.

WIND-WHEEL.

SPECIFICATION forming part of Letters Patent No. 401,139, dated April 9, 1889.

Application filed March 30, 1887. Serial No. 233,080. (No model.)

*To all whom it may concern:*

Be it known that I, WILLIAM ECKER, a citizen of the United States, residing at Newark, in the county of Essex and State of New Jersey, have invented certain new and useful Improvements in Wind-Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to certain improvements upon that patented to me February 8, 1887, in Letters Patent No. 357,471, the object of which is to secure greater durability and efficiency in the construction of a wind-wheel.

The invention consists in the construction and combination of parts hereinafter set forth and claimed.

Figure I is a side elevation of a portion of a wheel made according to this invention, showing one blade in place. Fig. II is a plan view of a portion of the tire or rim. Fig. III is a section of the rim taken near the clamp which unites its two ends. Fig. IV is an elevation of a portion of a blade. Fig. V is an elevation of a portion of a blade with one spoke applied. Fig. VI is a longitudinal sectional view of the hub, showing the manner of attaching and adjusting it upon the shaft. Fig. VII is a sectional view of the joint of the rim and the clamp used at this point.

In said drawings, A indicates the tire or rim of the wheel, B the wire spokes, and C represents the hub of what are commonly known as "tension-wheels" similar to those used for bicycles.

In carrying out my invention each wire is bent to form two spokes, each of which is passed through an aperture in the tire or rim and its ends passed through perforations in the disks or plates C, which form the ends of the hub, and are bent around the periphery of said plates, and then are firmly clamped thereto by shrinking metallic bands C' upon the outside thereof, said bands being expanded by heating the same, which, when cool, shrink and firmly bind the ends of the wires to said plates and hold them in position, as will be understood by referring to Figs. I, II, and VII. The rim or tire may be formed in either one or more pieces, the connecting ends being firmly secured by means of a clip, D, which is firmly secured upon the under or inner side of said rim, by means of rivets or other appropriate fastenings, and its projecting edges bent outward and clinched around the outer edges of the periphery of said rim, as indicated in Figs. I, V, and VI, Fig. V showing the clip D in longitudinal section and a portion of the rim in side elevation, with the spokes B omitted.

In order to spread the disks C apart to exert the requisite tension upon the spokes, I place a threaded boss or bosses, E, upon the shaft $b$, which is threaded to receive them on the inside or outside, or on both sides, of one disk, so that this disk may be moved in one direction or the other to make the tension on both set of spokes greater or less, as desired. The opposite disk is held rigid by collar $d$, which is fixed on the shaft by set-nuts $d'$ and a separate collar, $d^*$, on the opposite side of the same disk bolted to the collar $d$, or otherwise secured upon the shaft $b$.

In order to secure the fans to the spokes, I form loops therein by making two incisions, which may or may not be parallel with each other, and then press the severed portions $e$ between the incisions outward, thereby forming loops, as will be understood upon referring to Figs. III and IV. These loops being formed, as described, at the desired location or point, the fans are adjusted and may be soldered upon the wires before the ends are bent and secured to the disks of the hub, as will be understood upon referring to Fig. III, thus forming a very simple and efficient means of fastening said fans and avoiding any liability of the same becoming loose or disarranged.

It may be observed that the wire spokes may pass through the tire or rim in a straight line—circumferentially or diagonally, as may be preferred—and in order to facilitate the bending and clinching of the clip over the periphery of the rim or tire of the wheel the edges of said clip are scalloped or notched, as will be observed by a reference to Figs. I and V.

In my former patent, above referred to, as well as in all other patents with which I am acquainted, no provision is made for making a strong and reliable connection of the spokes to the hub, as in all such situations, so far as I am aware, the wire spokes have simply been extended through and bent over, but not clinched upon nor bound by auxiliary holding means, as I do in this present invention. The importance of making a secure and tight connection is readily appreciable when the location in which the wheel is to work is taken into account and the strains to which it is subjected are reckoned. A joint which is liable to become loose and insecure would render the wind-wheel much less valuable. With the present construction the possibility of becoming loose is entirely obviated.

Having thus described my invention, what I claim as new, and desire to secure by Letters Patent of the United States, is—

1. In a wheel such as described, the combination of disks C, having a series of perforations near their peripheries, spoke-wires inserted through said perforations and bent up and over the peripheries of said disks, and metallic bands or rings, as C', fitting over the ends of the spoke-wires and the peripheries of the disks in line with said disks and forming the exterior rim or circumference thereof when in place, as set forth.

2. In a wheel such as described, the combination of disks C and spoke-wires B, a screw-shaft on which the disks are mounted, a nut or nuts on the shaft for adjusting one of said disks, and a fixed collar against which the other disk is held, as set forth.

In testimony that I claim the foregoing I have hereunto set my hand this 18th day of March, 1887.

WILLIAM ECKER.

Witnesses:
 OLIVER DRAKE,
 OSCAR A. MICHEL.